United States Patent [19]

Nicholson

[11] 4,451,051
[45] May 29, 1984

[54] CYLINDER HEAD GASKETS

[76] Inventor: Terence P. Nicholson, Calf Hall, Muggleswick, Derwentside, County Durham, England

[21] Appl. No.: 379,443

[22] Filed: May 18, 1982

[51] Int. Cl.³ .............................................. F16J 15/08
[52] U.S. Cl. ............................. 277/235 B; 277/207 R; 277/213; 277/236
[58] Field of Search ............... 277/213, 200, 234, 233, 277/235 R, 235 A, 235 B, 236, 207 R, 215

[56] References Cited

U.S. PATENT DOCUMENTS

| 1,853,175 | 4/1932 | Oven | 277/235 B X |
| 1,864,854 | 6/1932 | Oven | 277/235 B X |
| 2,681,241 | 6/1954 | Aukers | 277/235 B X |
| 4,203,608 | 5/1980 | Nicholson | 277/235 B |
| 4,290,616 | 9/1981 | Nicholson | 277/235 B |
| 4,335,890 | 6/1982 | Nicholson | 277/235 B |
| 4,372,564 | 2/1983 | Nicholson | 277/235 B |

FOREIGN PATENT DOCUMENTS

| 893598 | 10/1953 | Fed. Rep. of Germany | 277/235 B |
| 323075 | 12/1929 | United Kingdom | 277/235 B |
| 508050 | 6/1939 | United Kingdom | 277/235 B |
| 1278321 | 6/1972 | United Kingdom | 277/235 B |
| 1431183 | 4/1976 | United Kingdom | 277/235 B |
| 2063386 | 6/1981 | United Kingdom | 277/235 B |
| 2064677 | 6/1981 | United Kingdom | 277/213 |

Primary Examiner—Robert S. Ward
Attorney, Agent, or Firm—Murray Schaffer

[57] ABSTRACT

A gasket for sealing the joint between the cylinder block and the cylinder head of a dry liner internal combustion engine comprises two outer metal plates (1) and a central composite metal plate (2) disposed between the two outer plates. The gasket is particularly characterized in that between cylinder bore openings in the gasket at least one shim (3,4) is secured between one side of the central composite metal plate and the adjacent outer metal plate, in order to prevent loss of load on the gasket in those areas and resultant gas leakage. Similarly at least one shim (5) may be located in like manner between the central plate and an outer plate at corners of the gasket.

2 Claims, 6 Drawing Figures

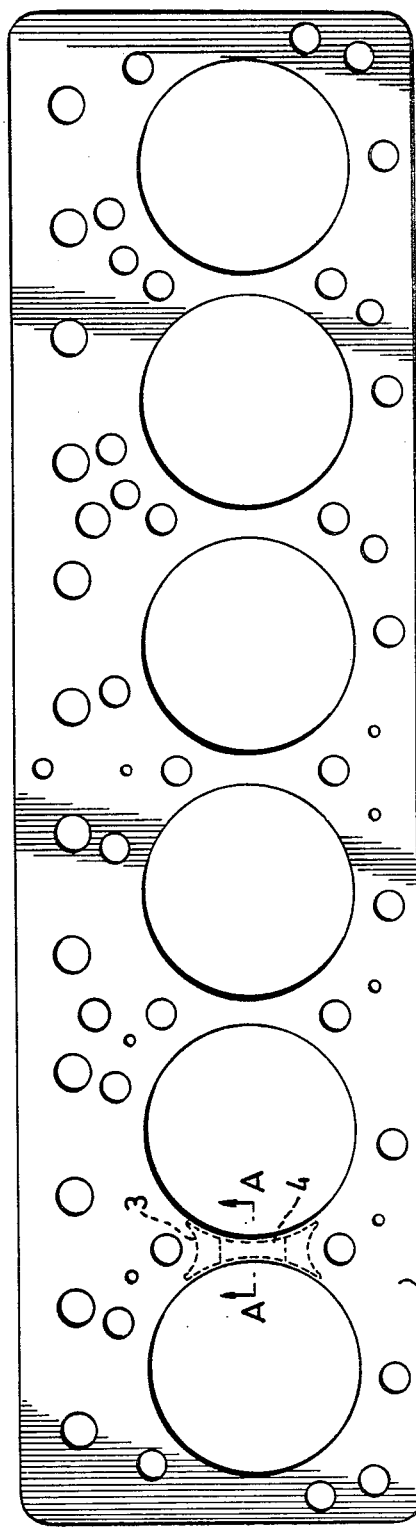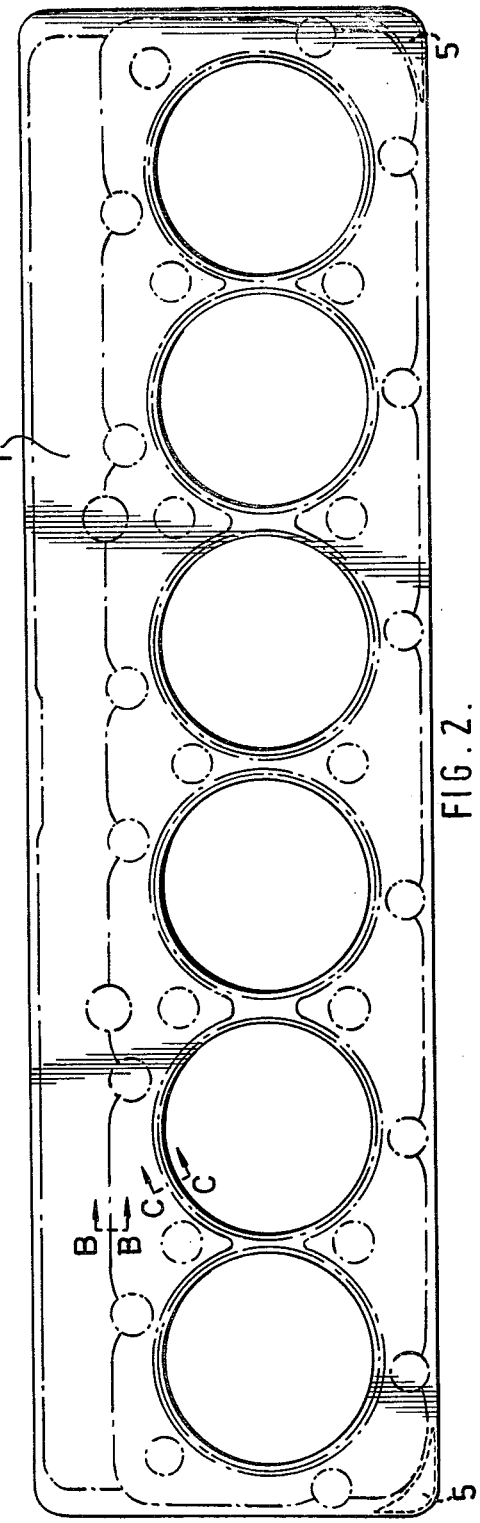

CYLINDER HEAD GASKETS

This invention relates to gaskets and more particularly to a gasket primarily intended for sealing the joint between the cylinder block and the cylinder head of an internal combustion engine having so-called dry cylinder bore liners.

With a view to avoiding certain shortcomings of previously known composite metal and asbestos layered gaskets for sealing the cylinder block, cylinder head joints in dry liner compression ignition engines, there has been disclosed in my co-pending British Pat. No. 2,063,386 corresponding to U.S. Pat. No. 4,290,616 a gasket which comprises a pair of outer metal plates having outwardly directed corrugations formed therein and a central composite metal plate disposed between the two outer plates, the said central composite plate comprising a central soft metal layer and hard metal surface layers which are bonded or integral therewith. Also in accordance with a further feature of that gasket each outer plate has a double waveform sectional configuration in which the distance between a plane which contains the apices of the two waves and the plane parallel thereto which contains the base of the trough between the two waves is significantly less than the distance between the first plane and the base plane of the plate. In the same patent application it was also proposed that the surfaces of the central composite metal plate should be hardened by rolling the surfaces after a bright annealing operation.

It has now been found as a result of further experience, research and development that due to the cellular structure of certain cylinder heads localized loss of load on the gasket can occur and this in turn can be the cause of gas leakage usually between the cylinder bores.

There is thus proposed in accordance with the present invention a gasket constructed substantially in accordance with the above numbered patent application but characterised in that between cylinder bore openings in the gasket at least one shim is secured between one side of the central composite metal plate and the adjacent outer metal plate. Preferably each such shim is welded in position on the side of the centre plate which in use is intended to be nearest the cylinder head.

Further in accordance with the invention it is proposed that at each of one pair of corners of the gasket a shim should be inserted between the centre plate and one of the outer plates. The purpose of these corner shims is to obviate water leakage tending to occur at two lower extreme corners of the gasket and caused by a hammer effect to the corners of the gasket when subjected to peak pressures and which also result in loss of load at those two places.

A particular and at present preferred form of gasket in accordance with the invention is hereinafter described by way of example with reference to the accompanying drawings in which:

FIG. 1 is a general plan view of a cylinder head gasket for a six cylinder engine to illustrate only the positions of cylinder bore, stud end cooling liquid apertures required therein;

FIG. 2 is a more detailed plan view of the gasket shown in FIG. 1;

Figure 3:
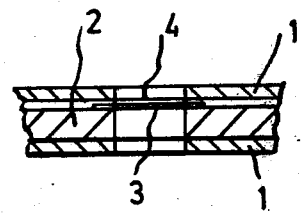
FIG. 3 shows a section on an enlarged scale on line A—A of FIG. 1 to indicate the position of the shims.

Referring now to the drawings, the gasket comprises two outer cold rolled mild steel bright annealed grade CS4 plates 1 of 0.015 inches thickness copper plated all over and an interposed central composite plate 2 made of the same material which has been bright annealed and softened. It has however been subjected to a skin rolling operation which has the effect of forming a hard metal layer on each of its surfaces. Apart from this the outer plates 1 are formed with corrugated configurations of two different forms. The paths of these corrugations on the gasket are illustrated in chain dashed lines in FIG. 2, the chain lines being drawn at the peaks or locus points of the corrugations.

Figure 4:
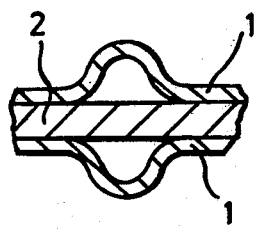
FIG. 4 is a section on line B—B of FIG. 2.

Referring to FIG. 2 in conjunction with FIG. 4 one form of corrugation, which runs along each side margin of the gasket is of single V-shaped profile. The single wave has an overall width of 0.063 inches and a height, noted from the outer surface of the plate 1, of between 0.037 and 0.040 inches.

Figure 5:
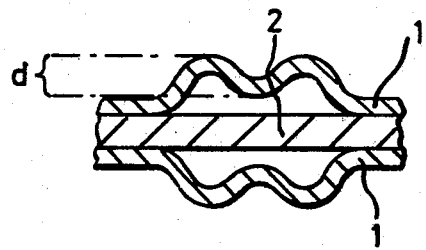
FIG. 5 is a section on line C—C of FIG. 2.

The other form of corrugation, which circumscribes each cylinder bore opening is of double V-shaped profile as illustrated in FIG. 5. This double V-shaped profile has the characteristic defined by pending British patent application No. 4350/78 corresponding to U.S. Pat. No. 4,203,608 that the distance d between a plane which contains the apices of the two waves and a plane parallel thereto which contains the base of the trough between the two waves is significantly less that the distance between the first plane and the base plane of the sheet. In the present instance the overall width of the two waves is 0.125 inches, the distance between wave peaks is 0.063 inches and the distance d is 0.030 inches.

Referring now to FIGS. 1, 2 and 3, it is to be noted that in each of the five spaces between the six cylinder bore openings there is disposed a pair of steel inserts or shims each of 0.002 inches thickness spot welded in position on the top, that is to say the cylinder head side of the centre plate. The positon and profile of these shims is indicated by the chain-dashed lines 3 and 4 in FIG. 1.

Additionally, at each of the two lower extreme corners there is attached to the gasket, outside the corrugation to the central plate a somewhat triangular rounded shim 5 of 0.002 inches thickness which effectively prevent water leakage caused by a hammer effect to the corner at peak pressures and a consequential loss of load.

Figure 6:
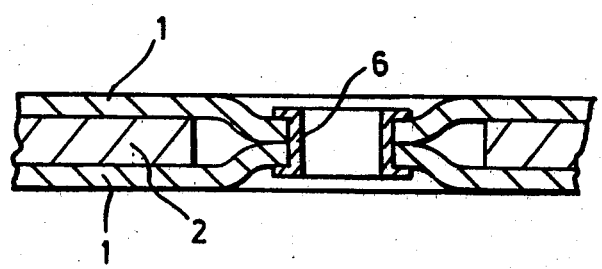
FIG. 6 is an enlarged scale fragmentary view showing the mode of securing together the various sheet layers of the gasket.

As shown in FIG. 6 the constituent layers of the gasket are clamped together whenever required for a particular installation by means of a hollow rivet 6.

I claim:

1. A gasket for sealing the joint between the cylinder block and the cylinder head of a dry liner internal combustion engine and comprising a first outer metal plate intended to be placed next to said cylinder block, a second outer metal plate and a central composite metal plate disposed between the first and second outer plates, said central plate comprising a central soft metal layer and hard metal surface layers integral therewith, the outer plates having at least one wave form corrugation therein, characterised in that between each of the cylinder bore openings in the gasket at least one shim is welded to the surface layer of the side of the central composite metal plate adjacent said first outer metal plate.

2. A gasket in accordance with claim 1, in which also at corners of the gasket at least one shim is welded to the surface of the side of the central composite metal plate adjacent said first outer metal plate.

* * * * *